Dec. 13, 1949

B. R. ABBOTT
APPARATUS FOR MAKING CORKBOARD
INSULATION AND THE LIKE 2,490,765

Filed Nov. 12, 1946

4 Sheets-Sheet 1

INVENTOR
BOYD R. ABBOTT
by
Walter + Kaufman
ATTORNEY

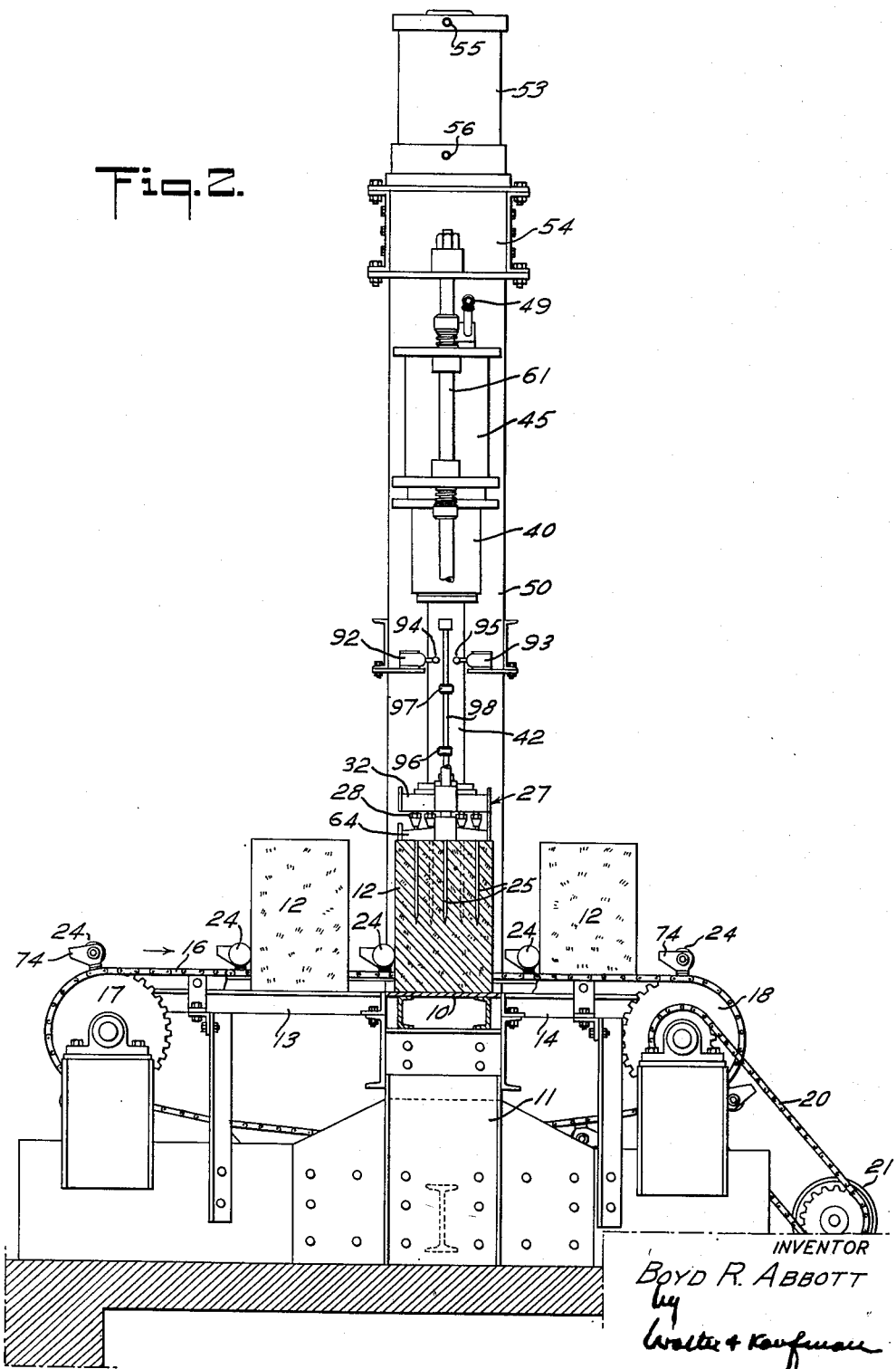

Dec. 13, 1949  B. R. ABBOTT  2,490,765
APPARATUS FOR MAKING CORKBOARD
INSULATION AND THE LIKE
Filed Nov. 12, 1946  4 Sheets-Sheet 3

INVENTOR
BOYD R. ABBOTT
by
Walter & Kaufman
ATTORNEY

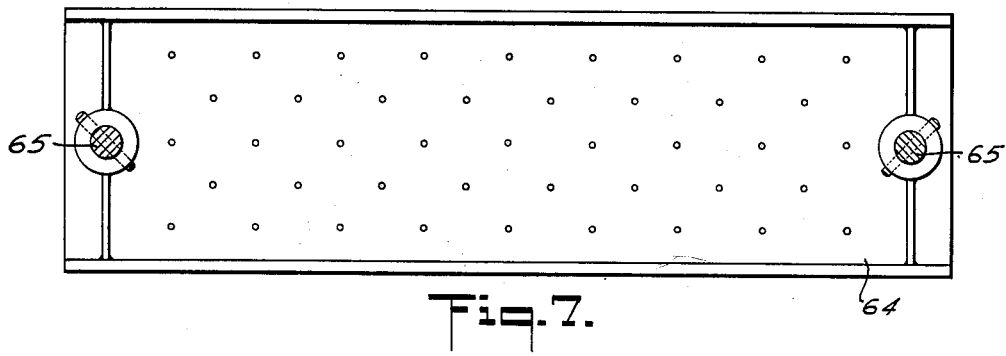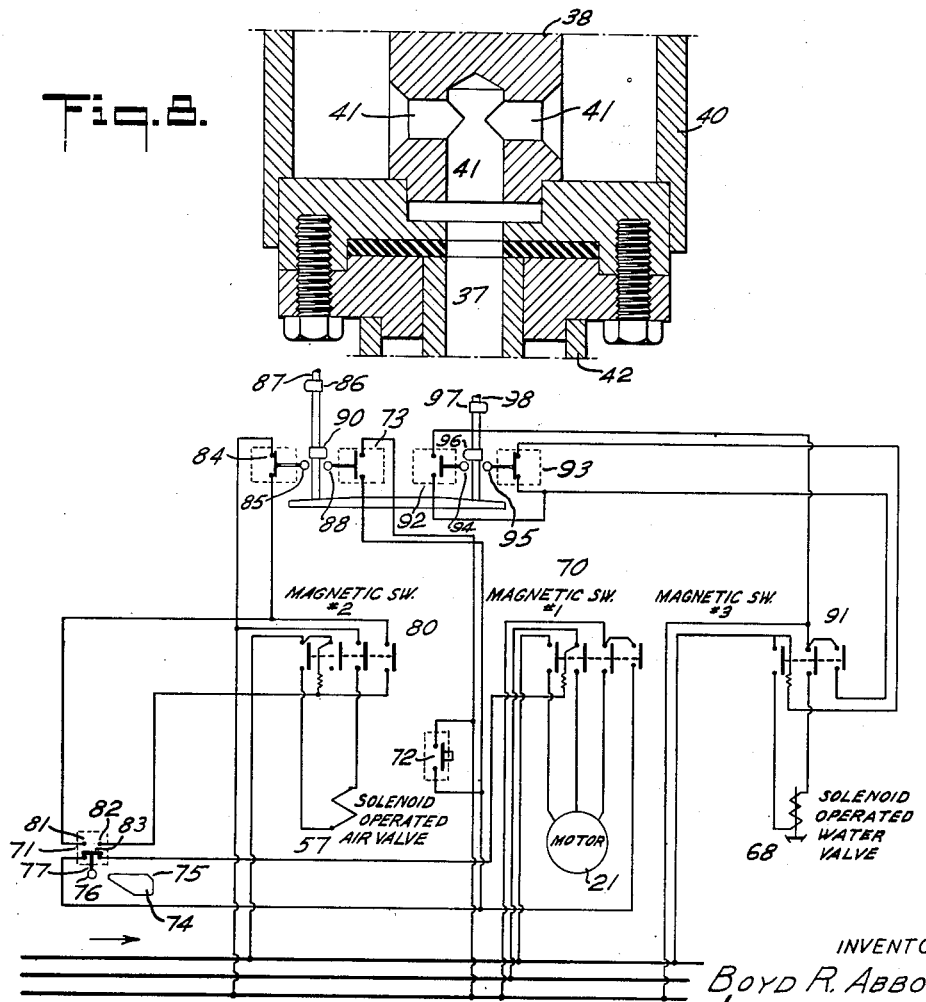

Patented Dec. 13, 1949

2,490,765

UNITED STATES PATENT OFFICE 2,490,765

APPARATUS FOR MAKING CORKBOARD INSULATION AND THE LIKE

Boyd R. Abbott, Norristown, Pa., assignor to Armstrong Cork Company, Lancaster, Pa., a corporation of Pennsylvania Application November 12, 1946, Serial No. 709,313

12 Claims. (Cl. 257—73)

1

This invention relates to the making of cork insulation and more particularly to an apparatus for injecting a cooling fluid into a block of molded corkboard upon completion of baking to reduce the temperature of a molded hot block of compressed cork granules below the point where internal charring or burning will occur.

In the manufacture of cork insulation, the cork granules are molded into blocks under pressure in a closed mold while subjected to superheated steam at a temperature approximating 550° F. The blocks are of a size for example about thirty-seven inches in length by about thirteen inches by nineteen and one-half inches, convenient for cutting into slabs suitable for commercial use. When these molded blocks leave the mold with retained temperatures approximately that of the supplied steam and when then exposed to the atmosphere, the entering air, reaching the interior of the block, generates not only sufficient heat to char the block internally, but to become a dangerous fire hazard, though in either case the block is ruined as a commercial product.

Some of the objects of the present invention are: to provide an improved apparatus for making corkboard insulation; to provide a novel apparatus for treating hot molded cork blocks to eliminate the danger of charring or burning when exposed to the atmosphere; to provide a novel apparatus for treating superheated molded cork blocks wherein a cooling medium is caused to permeate the interior of the heated block and reduce the temperature of the block below a charring temperature; to provide a novel apparatus for treating hot molded cork blocks wherein piercing devices are arranged to enter the block to provide for the injection of a cooling medium for distribution within the block to reduce the temperature below the charring point; and to provide other improvements as will hereinafter appear.

Figure 1:
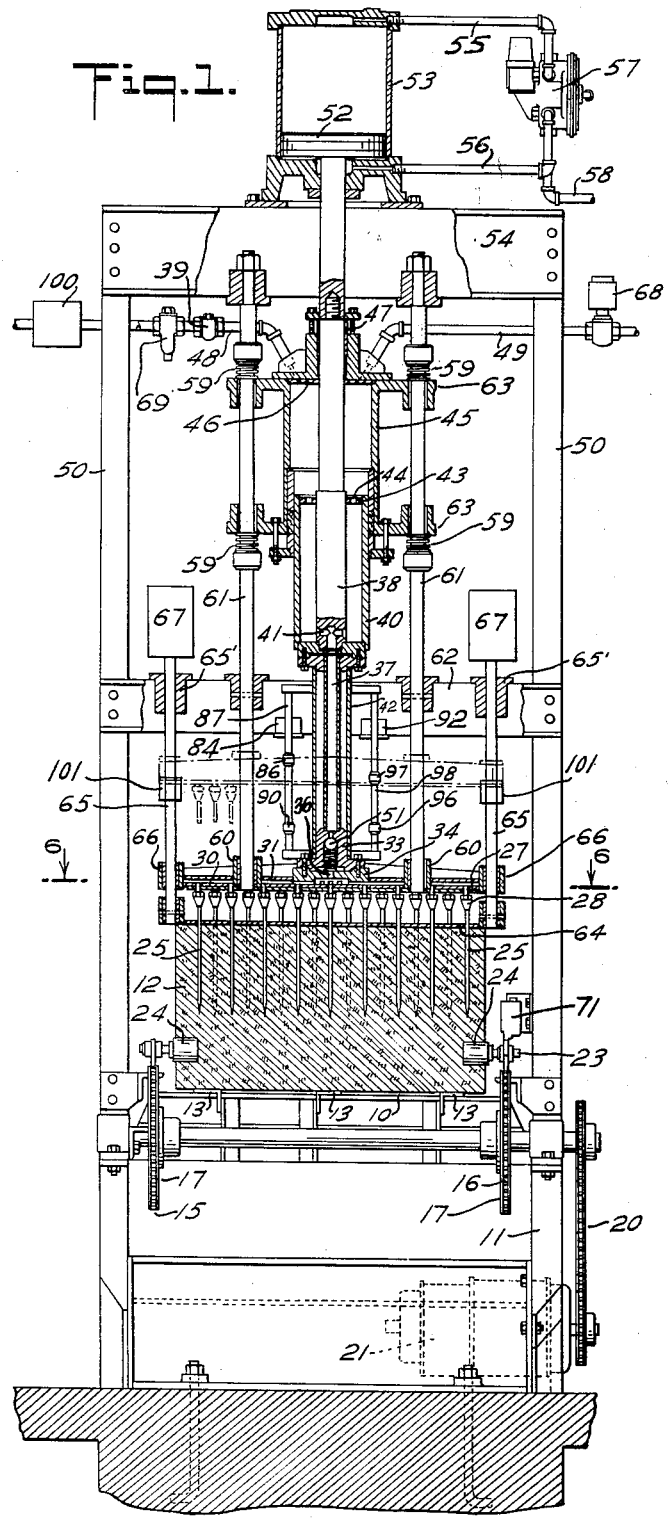
Figure 3:
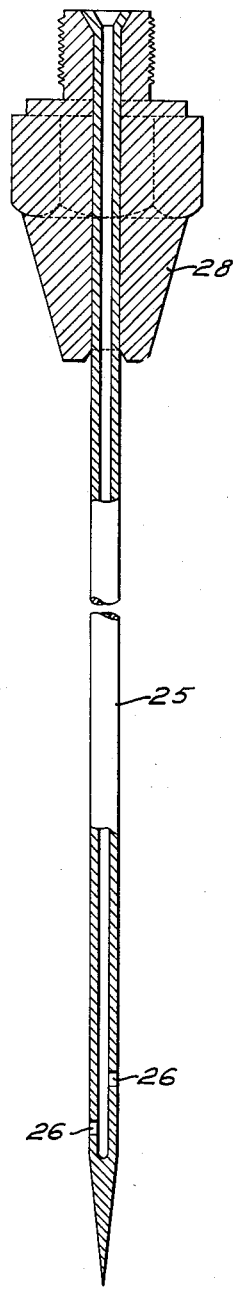
Figure 4:
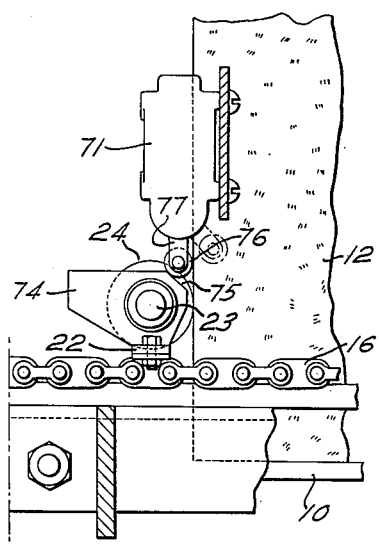
Figure 5:
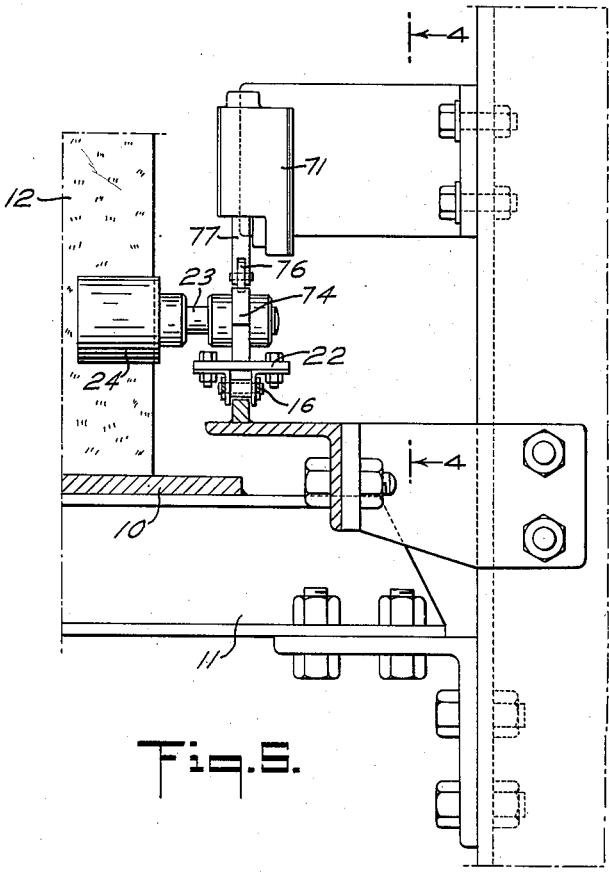
Figure 6:
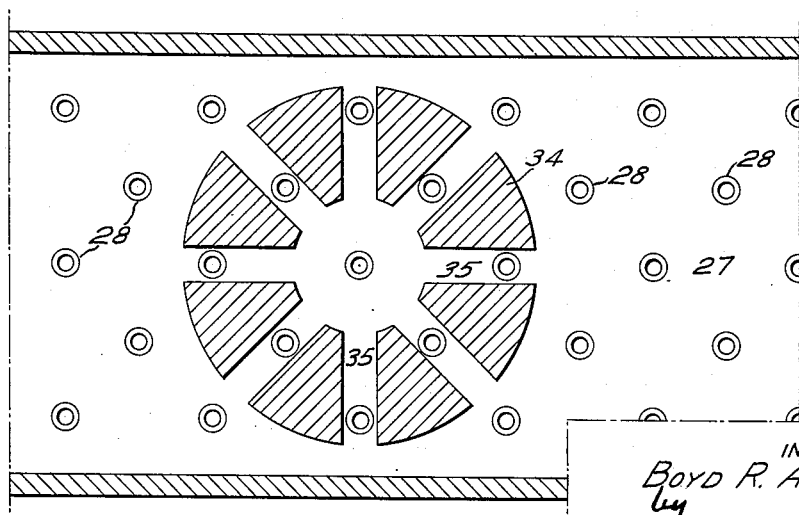

In the accompanying drawings, Fig. 1 represents a front elevation, in part section, of an injection press embodying one form of the present invention; Fig. 2 represents a side elevation of the same partly in section; Fig. 3 represents one of the injection needles on an enlarged scale; Fig. 4 represents a detail in side elevation showing the cam for controlling one of the limit switches; Fig. 5 represents an end elevation of the parts shown in Fig. 4; Fig. 6 represents a section on line 6—6 of Fig. 1; Fig. 7 represents a plan of the stripper plate; Fig. 8 represents a sectional detail of an enlarged scale of the water

2 inlet port construction; and Fig. 9 is a schematic wiring diagram of electrical control circuits for the apparatus.

Referring to the drawings, one form of apparatus embodying the invention comprises a bed 10 mounted in horizontal position upon a suitable substantial base structure 11 and at a convenient height to receive molded cork blocks 12 which are to be fed one at a time into position upon the bed.

For supporting the blocks 12 for delivery to and away from the bed 10, the base structure 11 is provided with suitably spaced rails 13 extending laterally from the bed 10 to a receiving point. These rails 13 are rigidly supported with the upper faces thereof in the plane of the bed 10. In this way the blocks 12 pass smoothly from the rails 13 to the bed 10 and from the bed 10 to corresponding rails 14 positioned on the opposite end of the bed 10. As shown, the rails 13 are of a length to support more than one block 12 at a time, and the rails are positioned to receive the hot blocks as each is discharged from the molding operation by a suitable conveyor, not shown.

In order to feed the blocks 12 along the rails, and with an intermediate rest point when the block is registered over the bed 10, two conveyor chains 15 and 16 are driven at opposite sides respectively of the base structure, by pairs of sprockets 17 and 18, which in turn are given a step-by-step rotation by a chain and sprocket drive 20 from an electric motor 21. The two chains 15 and 16 are each provided at spaced intervals with bearing brackets 22 (Figure 4) for supporting respectively laterally disposed stub shafts 23 as journals for sleeve-like push rollers 24. The arrangement is such that the rollers 24 on the chain 15 are respectively in lateral alinement with the rollers 24 on the chain 16 (Figure 1) and each pair of alined rollers 24 is spaced from the next pair such a distance as to receive one block between the pairs.

For the purpose of introducing water or other cooling medium into the hot molded block to reduce the internal temperature below that at which spontaneous combustion would occur, a plurality of tubular needles 25, each having discharge outlets 26 at the piercing end, are provided, the same depending from a transversely disposed platen 27 by means of couplings 28 which open into chamber 30 to form inlets to the respective needles 25. The platen 27 forms the bottom of the chamber 30 and a plate 31 the top, while a peripheral flange 32 (Figure 2) closes the chamber.

As a means of admitting the cooling medium to the chamber 30, the plate 31 is provided with a valve housing 33 in the form of a disc 34 having radially arranged discharge outlets 35 (Figures 1 and 6) communicating with the chamber 30, and an inlet port 36 communicating with the lower end of a vertically disposed supply pipe 37. The upper end of the pipe 37 terminates in axial abutting alinement with a piston rod 38 carrying a tubular injection piston 40, and has communication with the piston 40 by way of axially disposed lateral ports 41 in the piston rod 38. The lower end of the piston 40 is closed and is bolted or otherwise made fast to the head of a cylindrical extension 42 which carries at its lower end the aforesaid valve housing 33. The upper head 43 of the piston 40 is provided with ports 44 which admit the cooling fluid into the piston 40 and from which it is injected through the ports 41 into the pipe 37 on the upstroke of the piston 40. The piston 40 rides within a cylinder 45, the head 46 of which serves as a guide for the piston rod 38 in conjunction with a stuffing box 47. Also, the head 46 is provided with an inlet pipe 48 for hot water and a discharge pipe 49 for the same. The cylinder 45 is fixed to rigid side frames 50 rising from the base structure 11. Water is supplied from a source at usual city pressures, in the neighborhood of thirty pounds per square inch, through suitable heat apparatus, such as an instantaneous steam heater 100, diagrammatically shown, through a filter 69, and a check valve 39. The water is thus constantly supplied to a system including the cylinder 45 at about thirty pounds pressure. A solenoid operated control valve 68 is normally closed so that as the piston 40 rises within the cylinder 45, the water which fills the system is forced out through the needles 25, the check valve 39 preventing flow of the water into the pipe 48 and the solenoid valve 68 preventing the discharge of the water until the desired quantity has been injected into the block. This quantity may be predetermined and accurately measured or controlled by the actuation of the solenoid valve 68 as will be more fully hereinafter described.

From the foregoing it will be seen that as the piston 40 reciprocates under the movement of the piston rod 38, the entire needle assembly will lower and rise, this action on the down stroke causing the needles 25 to enter well within the positioned hot molded block 12 and on the upstroke eject the water from the piston 40, by way of ports 41, pipe 37, valve housing 33, chamber 30, and needles 25, into the hot block. It should be noted that the valve housing 33 includes a check valve 51 arranged to open under pressure of the water discharged from the pipe 37 in excess of line pressure, thirty pounds per square inch, in the example.

For producing the required reciprocation of the parts, the protruding upper end of the piston 38 terminates in a piston 52 riding in a cylinder 53 mounted upon a cross frame member 54 supported by the side frames 50. In this instance, air is used as the operating medium for the piston 52, and supply pipes 55 and 56 respectively communicate with opposite ends of the cylinder 53 but under control of a solenoid-operated four-way valve 57, which is supplied from a main pipe 58. The timing and operating cycle will be later described.

In order that the needles 25 and associated parts may be properly braced and restrained against misalinement, the platen 27 and the plate 31 are welded to a pair of tubular bosses 60, disposed at opposite sides of the valve housing 33 and arranged to slide respectively on two guide rods 61 which parallel opposite sides of the assembly, being rigidly held by the cross frame 54 and an intermediate frame brace 62. These rods 61 also serve as side supports for the water cylinder 45, from which the head plates 63 project laterally for anchoring to the guide rods 61. Cushioning springs 59 are provided for yieldingly supporting the cylinder 45 and its associated mechanism.

In Figures 1 and 2, the needles 25 are shown as extending slightly below the center of the block 12. It will be understood that the needles may be of a length such that they extend either above or below the location shown, depending upon the density of the block and other variable factors. The stroke of the piston 52 will, of course, have to be adjusted to accommodate the selected stroke of the injecting mechanism. Particularly good results have been achieved with forty-three needles in a thirty-seven inch by thirteen inch by nineteen and one-half inch block of corkboard having a density of about seven pounds per cubic foot with the needles extending to a point about one inch from the bottom of the block and injecting about six pints of water heated to about 200° F. The blocks as fed to the injection press were at a temperature of about 500° F. and immediately after water injection were found to have been reduced to a maximum of about 250° F. This is substantially below the ignition and charring temperatures. It is also well above the temperature at which water, as such, can be maintained in the block, the same having been converted into steam, thus absorbing the heat stored in the block which as mentioned above was initially at about 500° F. There will, of course, be deposited in the block when it reaches a temperature below the vapor point of the water a small quantity of water resulting from the condensation of the residual steam in the block when it reaches the vapor point, approximately 212° F. This generally will be in the order of two percent by weight of the block. Dry corkboard would ordinarily absorb at least that amount from the atmosphere.

To facilitate the stripping of the block 12 from the needles 25, a stripper plate 64 is provided which is located below and parallels the platen 27, the said plate 64 being apertured for the passage of the respective needles 25. Rods 65 are attached at opposite ends of the plate 64, respectively, and are slidingly arranged in bosses 65' anchored to the brace member 62. Also, extensions terminating in bearing bosses 66 project from the platen 27 and the plate 31 as guides for these rods 65. The upper ends of the rods 65 are respectively terminated in counterweights 67, which function under gravity to hold the stripper plate 64 down as the needle assembly moves up. Since the stripper plate 64 normally rests upon the upper face of a block 12, during the insertion and removal of the needles 25 the weights 67 hold the stripper plate 64 down so that the needles 25 are drawn upwardly therethrough and the block 12 is thus released from the needles.

In order to lift the stripper plate 64 from the injected block so that it may be moved out of the injecting station and an untreated block inserted, stops 101 are secured to rods 65 and are positioned to be engaged by the bosses 66 on the injecting head assembly when the needles 25 have been extracted from the block. Upon engagement of the stops 101 by the bosses 66, further upward travel of the injecting head assembly elevates the stripper plate 64 away from the injected block.

In order to operate the machine automatically to carry out the required series of steps in proper sequence, a plurality of electrical circuits are provided as shown in Fig. 9, wherein one circuit controls the stopping and starting of the block conveyor through the medium of the motor 21, a second circuit controls the operation of the solenoid operated air valve 57, and a third circuit controls a solenoid valve 68 by which the discharge of water from the piston cylinder 40 is regulated.

The circuit of the motor 21 includes a magnetic switch 70, a stop limit switch 71, a starting switch 72, and an auxiliary starting switch 73, the latter two 72 and 73 being in parallel with each other but in series with the stop limit switch 71. The limit switches are of the spring actuated type wherein after being mechanically opened or closed as the case may be, each returns to its normal position. As shown, the stop limit switch 71 is located in the path of a series of stop cams 74 carried by the conveyor chain 16, and so spaced thereon as to trip the limit switch 71 at the proper time to ensure the block 12 being in operative position under the injection press of which the needles 25 form a part. Preferably, each stop cam 74 is mounted upon the stub shaft 23 of the push rollers 24 since the latter are properly spaced with respect to the travel of the blocks 12. Each stop cam 74 has a dwell 75 arranged to pick up a roller 76 carried by the projecting switch operating arm 77, in order, in this instance, to break the motor circuit and stop the conveyor.

The second circuit for controlling the solenoid air valve 57 comprises two separate branches for independently operating a magnetic switch 80, controlling the solenoid air valve 57 which admits air under pressure alternately above and below the piston 52 in the cylinder 53 to actuate the injection press. One of these branches includes two terminals 81 and 82 formed as a part of the stop limit switch 71, the arrangement being such that when the stop limit switch 71 is opened by a cam 74, the contactor 83 bridges the terminals 81 and 82 to thereby energize the magnetic switch 80 and actuate solenoid air valve 57 to cause the piston 52 to operate upon its working stroke so that the needles 25 pierce the block 12. The other of the two branches includes a snap limit switch 84 fixed to the machine frame so that its projecting contactor roller 85 is in the path of a cam tappet 86 which is fixed to rod 87 carried by the reciprocable extension 42. Preferably, the tappet 86 is adjustable on the rod 87 in order to vary the stroke of the needles should it be necessary, but is normally located to trip the limit switch 84 near or at the end of the down stroke. When the switch 84 is opened by the action of the tappet 86, the magnetic switch 80 is deenergized so that the solenoid air valve is released and the four-way valve is urged by its actuating spring to its normal position where it admits air to the lower end of the piston 52 and thereby withdraws the needles from the block 12.

In order to operate the auxiliary starting switch 73, it is mounted on the frame so that its spring pressed contactor arm and roller 88 is in the path of a tappet 90, here shown as fixed to the rod 87 in such a position that at or near the end of the upstroke of the needles the tappet 90 will cause the switch 73 to close and thereby energize switch 70 which will start the motor 21 for the next cycle.

The third control circuit includes a magnetic switch 91 which when energized opens the solenoid valve 68 to permit the discharge of water from the cylinder 45 and thus arrest the flow of water through the needles 25 as previously described, and when deenergized, the valve 68 closes to cut off the discharge of water, causing the same to be fed into and through the needles 25. The system being supplied with water through line 48 at about thirty pounds per square inch pressure completely fills the system up to the solenoid valve 68 upon the down stroke of the needles, and the valve 68 is opening only after the desired quantity of water has been injected into the block. If it is desired to inject all of the water in the system, it will not be necessary to open the valve 68, but it is preferred to have an excess of water in the system to take care of unusual conditions and inject only a portion of it. The energization of the switch 91 is controlled by two limit switches 92 and 93 in the circuit, having actuating arms and rollers 94 and 95 respectively arranged in the paths of two tappets 96 and 97 carried by a rod 98 attached to and movable with the reciprocable extension 42. The tappet 96 is located on the rod 98 so that it will actuate the switch 92 to close the circuit for magnetic switch 91 at or near the beginning of the down stroke of the needle press, while the tappet 97 is located on the rod 98 so that it will actuate the limit switch 93 to deenergize the magnetic switch 91 as the rod 98 moves upwardly, after a desired quantity of water has been injected through the needles 25, discharge of the excess in the system being effected through the solenoid valve 68.

The cycle of operation is as follows: Assuming that a baked cork block has been delivered to the receiving end of the machine and is in position to be engaged by one pair of the push rollers 24, the starting switch 72 is manually closed to thereby shift the magnetic switch 70 to close the circuit of the motor 21. This causes the conveyor to operate and through the push rollers 24 feed a cork block 12 into the machine in register with the press carrying the needles 25. During the feeding of the block, the cam 74 brings its dwell 75 into contact with the limit switch roller 76 which is then actuated to break the motor circuit, to stop the conveyor, simultaneously bridging the terminals 81 and 82 to close the circuit to energize the magnetic switch 80. This latter then actuates the solenoid air valve 57 to admit air under pressure into the cylinder 53 above the piston 52, and the needles 25 starting travelling downward to enter the positioned block.

As piston 52 moves down in cylinder 53, rods 87 and 98 move downwardly in unison therewith. Cam tappet 90 rides over the control roller 88 of limit switch 73 without effecting any change in the system since switch 73 is a one-way switch responsive only to movement in an upward direction. Tappet 96, however, engages roller 94 on limit switch 92 which is effective for energizing magnetic switch 91, which in turn controls the solenoid valve 68 for the water discharge, closing the same. The tappet 97 on rod 98 will pass freely over roller 95 of limit switch 93 since this is also an up-operating, one-way limit switch. As downward movement continues to the desired lowermost position, tappet 86 engages the contacting roller 85 of limit switch 84, thus breaking the circuit for the magnetic switch 80 and de-energizing the solenoid 57, which causes the four-way valve to return to its normal position and air is admitted below the piston 52 in cylinder 53 and the piston 38 is elevated. This effects the injection of water through the needles 25 into the block 12. As the movement of the piston 52 continues in an upward direction, cam tappet 97 engages contact 95 of limit switch 93, which breaks the circuit for magnetic switch 91, thus releasing solenoid valve 68 and permitting the discharge of water through the pipe 49 from the cylinder 45. As heretofore mentioned, the tappet 97 is so positioned that it engages the roller of switch 93 only after the desired quantity of water has been injected into the formed block. By adjustment of the position of the tappet 97, the quantity of water injected can be nicely controlled. As the upward movement of the piston 52 continues, tappet 86 will engage the roller 85 on limit switch 84, but since this is a down-acting switch, no change will be effected in the control system. Upward movement will continue until tappet 90 engages contact roller 88 of limit switch 73, which thereupon energizes magnetic switch 70 and starts the motor 21. The cycle repeats from that point on.

The apparatus herein disclosed is effective for carrying out the method described and claimed in my co-pending application Ser. No. 709,314, filed November 12, 1946, and entitled "Method of making corkboard insulation and the like."

While the mechanism has been illustrated and described for operation upon a thirty-seven inch by nineteen and on-half inch by thirteen inch block, it will be clear that the apparatus may be conveniently arranged to operate upon blocks of any given size. Where large blocks are made in the molds, it may be desirable to first slab the blocks into smaller sized blocks say thirty-seven inches by thirteen inches by six inches prior to injection of the cooling medium.

The apparatus herein disclosed is practically completely automatic in operation and in actual use of the equipment it has been found that by its use as herein described, the corkboard blocks may be effectively and efficiently reduced in temperature without in any manner deleteriously affecting the structure of the corkboard. The needles, when withdrawn from the block, do not leave any visible openings in the block and it appears that the cork granules which are actually pierced by the needles tend to be resiliently urged back into their original position, closing the piercing openings.

The apparatus is inexpensive to operate since it requires but a very small quantity of water for effectively reducing the temperature of the formed block and requires very little maintenance due to its rigid construction. A single operator can conveniently handle the output of twenty to thirty corkboard molds with a single injection press, for the operation is, as pointed out above, completely automatic. The power required to operate the equipment is slight, a one and one-half H. P. motor being adequate for the block conveyor and air at eighty pounds pressure being effective for reciprocation of the injector head and its associated equipment.

While I have illustrated and described a preferred embodiment of my invention, it will be understood that the same may be otherwise embodied and practiced within the scope of the following claims.

Having thus described my invention, I claim:

1. In an apparatus for injecting a liquid cooling medium into a molded block of combustible organic material such as cork which is at a temperature above its ignition point to prevent internal charring of the block, the combination of a support for a block to be treated, injection means engageable with said block and having a plurality of openings for the delivery of a liquid cooling medium into said block at a plurality of spaced locations, means for bringing into engagement said injection means and said block to be treated disposed on said support, a source of liquid cooling medium, and means for delivering said liquid cooling medium under pressure from said source into said injection means and through the openings therein into the block to cause said liquid cooling medium to be distributed within the body of said block to prevent internal charring.

2. In an apparatus for injecting a liquid cooling medium into a superheated molded block of combustible organic material such as cork which has been removed from its forming mold and which is at a temperature above its ignition point to prevent internal charring of the block, the combination of a support for a block to be treated, a plurality of piercing devices, means for relatively moving said support and piercing devices to bring said piercing devices into engagement with said block to be treated disposed on said support to form a plurality of inlets into said block, a source of liquid cooling medium, and means for delivering said liquid cooling medium from said source into said inlets through said piercing devices under pressure to cause said liquid cooling medium to be distributed within the body of said block to prevent internal charring.

3. In an apparatus for injecting water into a molded block of combustible organic material such as cork which is at a temperature above its ignition point to prevent internal charring of the block, the combination of a support for a block to be treated, injection means engageable with said block and having a plurality of openings for the delivery of water into said block at a plurality of spaced locations, means for relatively moving said support and said injection means to bring said injection means into engagement with said block to be treated disposed on said support, a source of cooling water, and means for delivering said cooling water under pressure from said source into said injection means and through said openings therein into said block to cause said cooling water to be distributed within the body of said block to prevent internal charring.

4. In an apparatus for injecting cooling water into a molded block of combustible organic material such as cork which is at a temperature above its ignition point to prevent internal charring of the block, the combination of a support for a block to be treated, injection means engageable with said block and having a plurality of openings for the delivery of cooling water into said block at a plurality of spaced locations, means for relatively moving said support and said injection means to bring said injection means into engagement with said block to be treated disposed on said support, a source of cooling water heated to a temperature above 160° F., and means for delivering said heated cooling water under pressure from said source into said injection means and through said openings therein into said block to cause said heated cooling water to be distributed within the body of said block to prevent internal charring.

5. In an apparatus for injecting a liquid cooling medium into a superheated block of combustible organic material such as cork which has been removed from its forming mold and which is at a temperature above its ignition point to prevent internal charring of the block, the combination of a support for a block to be treated, a plurality of piercing devices, means for relatively moving said support and piercing devices to bring said piercing devices into engagement with said block to be treated disposed on said support to form a plurality of inlets into said block and to withdraw said piercing devices from within said block, a stripper plate engageable with said block and through which said piercing devices pass, means for holding said stripper plate in engagement with said block upon relative movement between said piercing devices and said support upon removal of said piercing devices from within said block, a source of liquid cooling medium, and means for delivering said cooling medium from said source into said inlets through said piercing devices under pressure to cause said liquid cooling medium to be distributed within the body of said block to prevent internal charring.

6. In an apparatus for injecting a liquid cooling medium into a superheated molded block of combustible organic material such as cork which has been removed from its forming mold and which is at a temperature above its ignition point to prevent internal charring of the block, the combination of a support for a block to be treated, a plurality of hollow piercing needles each having an inlet opening adjacent one end thereof and an outlet opening adjacent the other end thereof, means for relatively moving said support and piercing devices to bring said piercing devices into engagement with said block to be treated disposed on said support with the outlet openings of said piercing devices disposed within said block, a source of liquid cooling medium, and means for delivering said liquid cooling medium from said source into said needles and through said outlets therein under pressure to cause said liquid cooling medium to be distributed within the body of said block to prevent internal charring.

7. In an apparatus for injecting a liquid cooling medium into a superheated molded block of combustible organic material such as cork which has been removed from its forming mold and which is at a temperature above its ignition point to prevent internal charring of the block, the combination of a supporting bed for locating a molded block to be treated, a plurality of hollow piercing needles, means upon which said piercing needles are mounted for simultaneous motion, means for moving said needles toward said bed to project said needles into the body of said block to be treated disposed on said bed, each of said needles having an inlet opening and a discharge opening, a source of liquid cooling medium, and means for delivering said liquid cooling medium from said source to said needles and through said needles into the body of the block to prevent internal charring.

8. In an apparatus for injecting a liquid cooling medium into a molded block of combustible organic material such as cork which has been removed from its forming mold and which is at a temperature above its ignition point to prevent internal charring of the block, the combination of a support for a block to be treated, a conveyor for delivering a block to said support, means controlled by said conveyor for stopping said block on said support, a plurality of piercing devices, means for mounting said piercing devices in alignment with said support, means for relatively moving said support and piercing devices to bring said piercing devices into engagement with said block to be treated disposed on said support with said needles disposed within the body of said block, means operating in time relationship with said stopping means for actuating said moving means, and means operated by said moving means for introducing a liquid cooling medium from said source into said block through said piercing devices under pressure to cause said liquid cooling medium to be distributed within the body of said block to prevent internal charring.

9. In an apparatus for injecting a liquid cooling medium into a molded block of combustible organic material such as cork which has been removed from its forming mold and which is at a temperature above its ignition point to prevent internal charring of the block, the combination of a support for a block to be treated, a plurality of piercing devices, means for relatively moving said support and piercing devices to bring said piercing devices into engagement with said block to be treated disposed on said support to form a plurality of inlets into said block, a source of liquid cooling medium, and means for delivering said liquid cooling medium from said source into said inlets through said piercing devices under pressure during relative motion of said piercing devices with respect to said support to cause said liquid cooling medium to be distributed within the body of said block on said support as said needles move within the block and thereby prevent internal charring.

10. In an apparatus for injecting cooling water into a molded block of combustible organic material such as cork which has been removed from its forming mold and which is at a temperature above its ignition point to prevent internal charring of the block, the combination of a support for a block to be treated, a plurality of piercing needles, each having an inlet opening and a discharge opening with the discharge opening disposed adjacent the piercing end of the needle, means for relatively moving said support and needles to bring said needles into engagement with said block to be treated disposed on said support with the needles penetrating within the block, a source of cooling water, and means for delivering cooling water from said source through the discharge openings in said needles under pressure upon the relative movement of said needles with respect to said support and said block as the needles are being withdrawn therefrom to cause said cooling water to be distributed within the body of said block to prevent internal charring.

11. In an apparatus for injecting a liquid cooling medium into a superheated molded block of combustible organic material such as cork which has been removed from its forming mold and which is at a temperature above its ignition point to prevent internal charring of the block, the combination of a support for a block to be treated, a conveyor for delivering a block to said support, means controlled by said conveyor for stopping said block on said support, a plurality of piercing needles, means for mounting said needles in alignment with said block, a reciprocating mechanism for moving said needles and said mounting means toward and away from said block to cause said needles to enter said block and form inlets therein, means operating in timed relationship with said stopping means for actuating said reciprocating mechanism, a source of liquid cooling medium, and means operable on the upstroke of said reciprocating means for delivering said liquid cooling medium from said source into said inlets through said needles under pressure to cause said liquid cooling medium to be distributed with the body of said block to prevent internal charring.

12. In an apparatus for injecting a liquid cooling medium into a superheated molded block of combustible organic material such as cork which has been removed from its forming mold and which is at a temperature above its ignition point to prevent internal charring of the block, the combination of a support for a block to be treated, a plurality of piercing devices arranged in closely spaced relationship to engage said block upon said support and form inlets into the block throughout substantially the entire cross-sectional area thereof, means for relatively moving said support and piercing devices to bring said piercing devices into position within the block and extending from the top of the block to a point adjacent the bottom thereof, a source of liquid cooling medium, and means for delivering said liquid cooling medium from said source to said inlets through said piercing devices under pressure during motion of said piercing devices with respect to said block from substantially the top of the block to the bottom thereof to cause said liquid cooling medium to be distributed within substantially the whole of the body of the block to prevent internal charring.

BOYD R. ABBOTT.

REFERENCES CITED

The following references are of record in the file of this patent:

UNITED STATES PATENTS

| Number | Name | Date |
| --- | --- | --- |
| 681,121 | Hudson | Aug. 20, 1901 |
| 846,211 | Johnson | Mar. 5, 1907 |
| 997,056 | Grunzweig | July 4, 1911 |
| 999,824 | McCampbell | Aug. 8, 1911 |
| 1,960,486 | Freeman | May 29, 1934 |
| 2,035,956 | Freeman | Mar. 31, 1936 |
| 2,258,173 | Bratek et al. | Oct. 7, 1941 |
| 2,339,458 | Champney | Jan. 18, 1944 |